US010530713B2

(12) United States Patent
Elhaddad et al.

(10) Patent No.: US 10,530,713 B2
(45) Date of Patent: *Jan. 7, 2020

(54) MANAGEMENT OF MULTILEVEL QUEUES FOR SHARED NETWORK ADAPTERS

(71) Applicant: Microsoft Technology Licensing, LLC, Redmond, WA (US)

(72) Inventors: Mahmoud Elhaddad, Newcastle, WA (US); Mukund Sankaranarayan, Sammamish, WA (US); Mitesh Desai, Sammamish, WA (US); Henrique Filgueiras, Kirkland, WA (US); Mingtzong Lee, Woodinville, WA (US); Nar Ganapathy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/237,045

(22) Filed: Aug. 15, 2016

(65) Prior Publication Data

US 2016/0352655 A1    Dec. 1, 2016

Related U.S. Application Data

(63) Continuation of application No. 13/907,858, filed on Jun. 1, 2013, now Pat. No. 9,426,081.

(51) Int. Cl.
*H04L 12/861*  (2013.01)
*H04L 12/877*  (2013.01)
(Continued)

(52) U.S. Cl.
CPC ............ *H04L 49/90* (2013.01); *G06F 13/102* (2013.01); *H04L 47/10* (2013.01); *H04L 47/245* (2013.01);
(Continued)

(58) Field of Classification Search
CPC ......... H04L 47/10; H04L 47/30; H04L 47/52; H04L 47/283; H04L 47/2441;
(Continued)

(56) References Cited

U.S. PATENT DOCUMENTS

| 4,958,341 A | 9/1990 | Hemmady et al. |
| 5,960,365 A | 9/1999 | Leih et al. |

(Continued)

FOREIGN PATENT DOCUMENTS

| CN | 1729442 A | 2/2006 |
| CN | 101222428 A | 7/2008 |

(Continued)

OTHER PUBLICATIONS

"Introduction to Intelligent Grouping and Resource Sharing (IGRS)", Retrieved at »http://hes-standards.org/doc/SC25_WG1_N1346_pdf», A Technical White Paper, Retrieved Date: Mar. 7, 2013, pp. 8.

(Continued)

*Primary Examiner* — Barbara B Anyan
(74) *Attorney, Agent, or Firm* — Davin Chin; Chin IP, PLLC

(57) ABSTRACT

Technology for managing queuing resources of a shared network adapter is disclosed. The technology includes selectively transferring data from data transmission sources to a queue of the shared network adapter based on status indications from the shared network adapter regarding availability of queuing resources at the shared network adapter. In addition, the technology also includes features for selectively controlling transfer rates of data to the shared network adapter from applications, virtual network stations, other virtual adapters, or other data transmission sources. As one example, this selective control is based on how efficiently data from these data transmission sources are transmitted from the shared network adapter.

24 Claims, 5 Drawing Sheets

(51) Int. Cl.
*H04L 12/851* (2013.01)
*H04L 12/865* (2013.01)
*H04L 12/931* (2013.01)
*H04L 12/835* (2013.01)
*H04L 12/801* (2013.01)
*G06F 13/10* (2006.01)
*H04L 12/823* (2013.01)
*H04L 12/841* (2013.01)
*H04L 12/859* (2013.01)
*H04L 12/937* (2013.01)
*H04L 12/947* (2013.01)
*G06F 15/167* (2006.01)
*H04L 12/873* (2013.01)

(52) U.S. Cl.
CPC ............ *H04L 47/283* (2013.01); *H04L 47/30* (2013.01); *H04L 47/32* (2013.01); *H04L 47/525* (2013.01); *H04L 47/6275* (2013.01); *H04L 49/351* (2013.01); *G06F 15/167* (2013.01); *H04L 47/2475* (2013.01); *H04L 47/52* (2013.01); *H04L 49/25* (2013.01); *H04L 49/254* (2013.01)

(58) Field of Classification Search
CPC ......... H04L 49/90; H04L 49/35; H04L 49/70; H04L 49/252; H04L 49/3027; H04L 49/351; H04L 49/356; G06F 15/167
See application file for complete search history.

(56) References Cited

U.S. PATENT DOCUMENTS

| | | | |
|---|---|---|---|
| 6,862,265 B1 | 3/2005 | Appala et al. | |
| 7,554,975 B2 | 6/2009 | Smith | |
| 7,590,058 B1* | 9/2009 | Cherchali | H04L 47/10 370/230 |
| 7,936,675 B2 | 5/2011 | Bailey et al. | |
| 8,248,945 B1 | 8/2012 | Sathe et al. | |
| 8,270,423 B2 | 9/2012 | Plamondon et al. | |
| 8,370,838 B1 | 2/2013 | Omelyanchuk et al. | |
| 9,560,661 B2 | 1/2017 | Elhaddad et al. | |
| 2001/0021174 A1* | 9/2001 | Luijten | H04L 49/254 370/229 |
| 2002/0064156 A1* | 5/2002 | Minkenberg | H04L 49/25 370/392 |
| 2003/0069938 A1* | 4/2003 | Russell | G06F 15/167 709/213 |
| 2003/0069939 A1* | 4/2003 | Russell | G06F 15/167 709/214 |
| 2004/0100980 A1 | 5/2004 | Jacobs et al. | |
| 2005/0060445 A1* | 3/2005 | Beukema | H04L 47/30 710/52 |
| 2005/0201403 A1 | 9/2005 | Wang | |
| 2005/0232279 A1* | 10/2005 | Brown | H04L 69/16 370/400 |
| 2006/0123204 A1* | 6/2006 | Brown | G06F 9/5077 711/153 |
| 2007/0105589 A1 | 5/2007 | Lu | |
| 2007/0268903 A1* | 11/2007 | Nakagawa | H04L 45/745 370/392 |
| 2007/0280105 A1 | 12/2007 | Barkay et al. | |
| 2007/0280175 A1 | 12/2007 | Cheng et al. | |
| 2008/0019277 A1 | 1/2008 | Schultz et al. | |
| 2008/0126564 A1* | 5/2008 | Wilkinson | H04L 12/64 709/242 |
| 2008/0195761 A1* | 8/2008 | Jabri | H04L 65/605 709/250 |
| 2008/0205348 A1 | 8/2008 | Malladi | |
| 2009/0031046 A1 | 1/2009 | Ruan et al. | |
| 2009/0073882 A1 | 3/2009 | McAlpine et al. | |
| 2009/0175226 A1 | 7/2009 | Ren et al. | |
| 2009/0254924 A1 | 10/2009 | Anirudh et al. | |
| 2011/0007746 A1 | 1/2011 | Mudigonda et al. | |
| 2011/0125905 A1 | 5/2011 | Baucke et al. | |
| 2011/0292792 A1 | 12/2011 | Zuo et al. | |
| 2011/0312288 A1 | 12/2011 | Fu et al. | |
| 2012/0033673 A1 | 2/2012 | Goel | |
| 2012/0159132 A1* | 6/2012 | Abel | G06F 9/3885 712/229 |
| 2012/0271903 A1 | 10/2012 | Luna | |
| 2013/0138836 A1* | 5/2013 | Cohen | H04L 49/351 709/250 |
| 2013/0194938 A1 | 8/2013 | Immonen et al. | |
| 2013/0254264 A1 | 9/2013 | Hankinson et al. | |
| 2013/0308565 A1 | 11/2013 | Riegel | |
| 2014/0003449 A1 | 1/2014 | Li | |
| 2014/0078970 A1 | 3/2014 | Guo et al. | |
| 2014/0105007 A1 | 4/2014 | Pathmasuntharam et al. | |
| 2014/0254565 A1 | 9/2014 | Pitchaiah et al. | |
| 2014/0348073 A1* | 11/2014 | Elhaddad | H04W 72/08 370/329 |

FOREIGN PATENT DOCUMENTS

| | | |
|---|---|---|
| CN | 102918499 A | 2/2013 |
| EP | 2259509 A | 12/2010 |
| EP | 2493235 A1 | 8/2012 |

OTHER PUBLICATIONS

"Meru Networks Brings Virtualization to Wireless LANs", Retrieved at «http://www.gulftelenews.com/Article_Full_View.php?art=411&pcat=42&subCat=44», Nov. 10, 2008, pp. 2.

"Virtualization at the Re Layer", Retrieved at «http://www.wifisecured.com/technology-rflayerasp», Retrieved Date: Mar. 7, 2013, p. 1.

Anonymous: "Intel VMDq Technology", Internet Citation, Mar. 2008 (Mar. 2008), pp. 1-22, XP002695771, [retrieved on Apr. 18, 2013].

Banchs, et al., "Providing Throughput and Fairness Guarantees in Virtualized WLANs through Control Theory", retrieved at «http://www.hamilton.ie/ppatras/pub/monet12.pdf», In Journal of Mobile Networks and Applications, vol. 17, Issue 4, Aug. 2012, pp. 11.

Chandra, et al., "MultiNet: Connecting to Multiple IEEE 802.11 Networks Using a Single Wireless Card", Retrieved at «http://research.microsoft.com/pubs/73564/multinet_infocom.pdf», in Twenty-third Annual Joint Conference of the IEEE Computer and Communications Societies, Mar. 2004, pp. 12.

Guo, et al., "SecondNet: A Data Center Network Virtualization Architecture with Bandwidth Guarantees", Retrieved at «www.stanford.edu/~shyang/Site/home_files/15-Guo.pdf», In Proceedings of the 6th International Conference on Emerging Networking Experiments and Technologies, Nov. 30, 2010, pp. 12.

International Search Report/Written Opinion dated Mar. 27, 2014 in PCT/US2013/060255, 13 pages.

International Search Report/Written Opinion dated Feb. 19, 2014, in PCT App. No. PCT/US2013/060495, 12 pages.

Non-Final Office Action dated Aug. 5, 2015 in U.S. Appl. No. 13/900,366, 5 pages.

Non-Final Office Action dated Mar. 21, 2016 in U.S. Appl. No. 13/900,366, 8 pages.

Non-Final Office Action dated Mar. 27, 2015 in U.S. Appl. No. 13/907,858, 13 pages.

Non-Final Office Action dated Mar. 4, 2015 in U.S. Appl. No. 13/900,366, 7 pages.

Non-Final Office Action dated Oct. 7, 2015 in U.S. Appl. No. 13/907,858, 14 pages.

Notice of Allowance dated Apr. 25, 2016 in U.S. Appl. No. 13/907,858, 6 pages.

Rao, et al., "Simplistic Constructive Routing Protocol for Multihop Wireless Mesh Networks", Retrieved at «http://www.ijaest.iserp.org/archieves/16-Aug-1-15-11/Vol-No.9-Issue-No.2/19.IJAEST-Vol-No-9-Issue-No-2-Simplistic-Constructive-Routing-Protocol-for-Multihop-Wireless-Mesh-Networks-268-272.pdf», In International Journal of Advanced Engineering Sciences and Technologies, vol. 9, Issue 2, Retrieved Date: Mar. 6, 2013, pp. 5.

(56) References Cited

OTHER PUBLICATIONS

Rivera, et al., "Virtualization of Wireless Network Interfaces Wi-Fi IEEE 802.11", Retrieved at «http://www.wseas.us/e-library/conferences/2010/Catania/TELE-INFO/TELE-INFO-07.pdf», In the Proceedings of the 9th WSEAS International Conference on Telecommunications and Informatics, May 2010, pp. 6.
Non-Final Office Action dated Apr. 17, 2017 in U.S. Appl. No. 15/420,052, 7 pages.
"Decision to Grant in European Patent Application No. 13776604.4", dated Apr. 24, 2017, 35 Pages.
Final Office Action dated Sep. 26, 2017 in U.S. Appl. No. 15/420,052, 8 pages.
Elhaddad, Mahmoud et al.; "Allocation of Shared Resources for Virtualized Networking"; U.S. Appl. No. 15/420,052, filed Jan. 30, 2017; 38 pages including Preliminary Amendment filed Feb. 16, 2017.
Notice of Allowance dated Sep. 22, 2016 in U.S. Appl. No. 13/900,366, 6 pages.
"Office Action Issued in Chinese Patent Application No. 201380077120.5", dated Jan. 31, 2018, 6 Pages.
"Office Action Issued in Chinese Patent Application No. 201380077120.5", dated Jan. 31, 2018, 11 Pages, including english translation and/or summary.
"First Office Action Issued in Chinese Patent Application No. 201380076773.1", dated Mar. 5, 2018, 11 Pages.
"Office Action Issued in European Patent Application No. 13779430.1", dated Jun. 29, 2018, 5 Pages.
"First Office Action Issued in Chinese Patent Application No. 201380076773.1", dated Mar. 5, 2018, 8 Pages. (W/o English Translation).
"Third Office Action Issued in Chinese Patent Application No. 201380077120.5", dated Aug. 30, 2018, 6 Pages.
"Second Office Action Issued in Chinese Patent Application No. 201380077120.5", dated Jul. 4, 2018, 7 Pages.
"Second Office Action Issued in Chinese Patent Application No. 201380076773.1", dated Jan. 4, 2019, 20 Pages.
"Third Office Action and Search Report Issued in Chinese Patent Application No. 201380076773.1", dated Jul. 5, 2019, 8 Pages.

* cited by examiner

MANAGEMENT OF MULTILEVEL QUEUES FOR SHARED NETWORK ADAPTERS

CROSS-REFERENCE TO RELATED APPLICATION(S)

This application is a continuation of U.S. patent application Ser. No. 13/907,858, filed Jun. 1, 2013, entitled "MANAGEMENT OF MULTILEVEL QUEUES FOR SHARED NETWORK ADAPTERS," now U.S. Pat. No. 9,426,081, issued Aug. 23, 2016. The entirety of this afore-mentioned application is incorporated herein by reference.

BACKGROUND

In many systems, multiple applications, data connections, or other data streams may contend for the same network queuing resources. For example, data from these and other sources may contend for a limited amount of queue space in a network adapter (e.g., a wireless radio, a network interface card, a network controller, etc.). In certain systems, the network adapter may be unaware of data (and characteristics of the data) until the data is queued in the network adapter. Thus, contention for network adapter queue space may reduce the effectiveness of quality of service, class of service, traffic shaping, congestion management, or other traffic management technologies that are, or otherwise would be, implemented in the network adapter.

In addition, use of network adapter virtualization technology (e.g., to enable resources of an underlying physical network adapter to be shared by multiple virtual stations or other virtual adapters) may further impact the effectiveness of traffic management technologies. Although network virtualization technology may enable multiple virtual adapters to access to a communications medium via a shared underlying physical network adapter, the use of many virtual adapters may also increase contention for network adapter queue space.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technology for managing queuing resources of a shared network adapter is disclosed. The technology includes selectively transferring data from data transmission sources to a queue of the shared network adapter based on status indications from the shared network adapter regarding availability of queuing resources at the shared network adapter. In addition, the technology also includes features for selectively controlling transfer rates of data to the shared network adapter from applications, virtual network stations, other virtual adapters, or other data transmission sources. As one example, this selective control is based on how efficiently data from these data transmission sources are transmitted from the shared network adapter.

As one example, the disclosed technology may be employed with Wi-Fi virtualization to manage the transfer of data to a queue of a network adapter from queues of virtual Wi-Fi stations or queue(s) of a network adapter driver. In this example, multiple applications, data connections, or other data streams may be associated with any of the virtual Wi-Fi stations and may be contending for queue space in the network adapter via their respective virtual adapters. Priority information may also be associated with each of these multiple data streams. In these and other scenarios, the technology may be employed to prevent or reduce "priority inversion" situations in which a lower priority data stream may preempt a higher priority data stream.

The disclosed technology may also be employed to enable or improve the operation of multiple virtual Wi-Fi stations or virtual Wi-Fi access points over a shared network adapter, for example in conjunction with Wi-Fi Direct, to facilitate or improve both peer-to-peer connection(s) and infrastructure connection(s) over a shared network adapter. However, the technology is not limited to these examples.

Other aspects of and applications for the disclosed technology will be appreciated upon reading and understanding the attached figures and description.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein.

DETAILED DESCRIPTION

Figure 1:
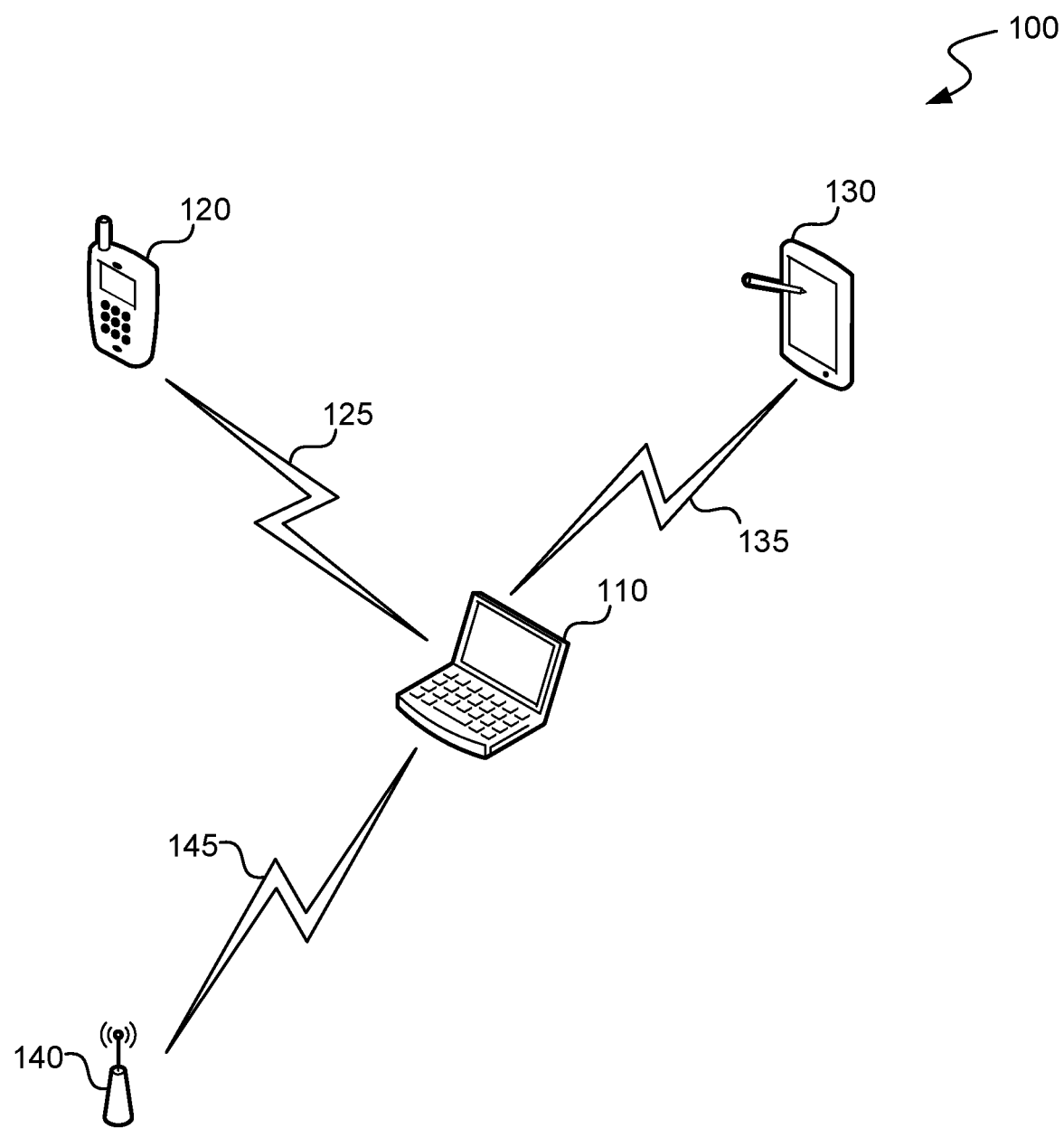
FIG. 1 is a diagram illustrating one example of a suitable environment in which aspects of the technology may be employed.

The following description provides specific details for a thorough understanding of, and enabling description for, various embodiments of the disclosed technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. For example, the term "based on" or "based upon" is not exclusive and is equivalent to the term "based, at least in part, on" and includes being based on additional factors, some of which are not described herein. References in the singular are made merely for clarity of reading and include plural references unless plural references are specifically excluded. The term "or" is an inclusive "or" operator and is equivalent to the term "and/or" unless specifically indicated otherwise. As used herein, the terms "component" and "system" are intended to encompass hardware, software, or various combinations of hardware and software. Thus, for example, a system or component may be a process, a process executing on a computing device, the computing device, or a portion thereof.

Introduction

Technology for managing queuing resources of a shared network adapter is disclosed. The technology includes selectively transferring data from data transmission sources to a queue of the shared network adapter based on status indications from the shared network adapter regarding availability of queuing resources at the shared network adapter. In addition, the technology also includes features for selectively controlling transfer rates of data to the shared network adapter from applications, virtual network stations, other virtual adapters, or other data transmission sources. As one example, this selective control is based on how efficiently data from these data transmission sources are transmitted from the shared network adapter.

In scenarios where multiple data streams contend for queuing resources in a shared network adapter, situations may occur in which a lower priority data stream may preempt a higher priority data stream. For example, such "priority inversion" may occur when the lower priority data stream utilizes queuing resources in the shared network adapter but the data of the lower priority stream cannot be transmitted from the shared network adapter due to network contention, a slow or non-responsive receiver, channel interference or noise, or other problems. In such a situation, the data may use the queuing resources of the shared network adapter for a lengthy or indefinite period, thus occupying queuing resources that could otherwise be used for data from another data source.

While data may be also queued by the virtual adapters or the network adapter drivers of many example devices (e.g., in an intermediate/pre-buffer queue to await transfer to the shared network adapter), the shared network adapter may be unaware of the data at these higher levels, or may be unaware of the priorities associated with this data until the data is transferred to the shared network adapter. In these systems, the inability to transfer data to the shared network adapter may preclude or complicate implementation of quality of service, class of service, traffic shaping, congestion management, or other adapter-based traffic management technologies. In particular, adapter-based traffic management typically employs priority information as inputs to its traffic management decisions for data that is queued at the shared network adapter.

The disclosed technology includes various aspects that address these and other issues. For example, the technology includes aspects for communicating availability of queuing resources from a shared network adapter to a higher level element such as a network adapter driver, for pausing or slowing the transfer of data to the shared network adapter, for flushing data associated with inefficient or low priority streams from the shared network adapter, and for prioritizing data transfers to the shared network adapter.

As one non-limiting example, the disclosed technology may be employed with Wi-Fi virtualization to manage queue space in a shared network adapter, to improve efficiency of virtual Wi-Fi adapters, and to improve overall performance of Wi-Fi virtualization systems. In addition, the technology may be employed to improve the ability of a shared network adapter to implement traffic management, to provide improved prioritization for latency or jitter sensitive traffic, or the like. However, any of the aspects of the technology may be employed for any suitable purpose.

Illustrative Devices/Operating Environments

FIG. 1 is a diagram of environment 100 in which aspects of the technology may be practiced. As shown, environment 100 includes computing devices 110, 120, and 130, as well as access point 140. As one non-limiting example, computing device 110 is configured to communicate with computing devices 120 and 130 as well as with access point 140 via wireless links 125, 135, and 145, respectively.

Computing device 110, along with computing devices 120 and 130, may be virtually any type of general- or specific-purpose computing device. For example, these computing devices may be user devices such as desktop computers, laptop computers, tablet computers, display devices, cameras, printers, or smartphones. Likewise, these computing devices may also be server devices such as application server computers, virtual computing host computers, or file server computers.

In the illustrated example, computing devices 110 and 120 are configured to communicate with each other over wireless link 125 while computing devices 110 and 130 are configured to communicate with each other over wireless link 135. As one example, wireless links 125 and 135 are Wi-Fi peer-to-peer links such as Wi-Fi Independent Basic Service Set (IBSS) links, Mesh Basic Service Set (MBSS) links, or Wi-Fi Direct links. However, there is no requirement for wireless links 125 and 135 to be either Wi-Fi links or peer-to-peer links. For example, wireless links 125 and 135 may be ZigBee links or Bluetooth links. In fact, wireless links 125 and 135 may employ any suitable air interface protocols or standards, or other communications protocols or standards, including those discussed above.

As illustrated, environment 100 also includes access point 140 which is linked to computing device 110 via wireless link 145. Access point 140 may be, for example, a Wi-Fi access point that is configured to provide a Basic Service Set (BSS) link between computing device 110 and a backend network such as the Internet or an intranet. However, access point 140 may alternately or additionally be any other type of device that provides access to a network or resource. For example, access point 140 may be a wireless repeater, a femtocell, an access point for a wide area network or metropolitan area network (e.g., a WiMax base station, a 4G base station, a Long Term Evolution (LTE) base station, etc.), or the like. In addition, access point 140 may either be a stand-alone/hardware access point or a Software Enabled Access Point (SoftAP), e.g., operating on a general-purpose computing device or on a smart phone. As with wireless links 125 and 135, wireless link 145 may also employ any suitable communications protocols or standards.

As shown in environment 100, computing device 110 is configured to communicate with computing devices 120 and 130, as well as with access point 140, via wireless links 125, 135, and 145, respectively. As discussed above, the communications over these links and with these devices/access points may be conducted by computing device 110 via separate networks using Wi-Fi virtualization technology. As one example, computing device 110 may include only a single physical wireless network adapter but be configured with multiple virtual adapters and associated components that enable sharing of the single physical wireless network adapter. However, in other examples, computing device 110 includes more than one physical wireless network adapter.

In implementing Wi-Fi virtualization technology, computing device 110 may also include any number of virtual adapters and associated components of any one or more types. For example, computing device 110 may include both a virtual non-access point Wi-Fi station as well as a virtual Wi-Fi SoftAP. In this example, the non-access point Wi-Fi station and the Wi-Fi SoftAP may be separate Wi-Fi entities that appear to upper level applications as independent/ separate media access control/physical layer interfaces. Computing device 110 may also employ any of the queuing resource management technology described herein to manage the transmission of data from any the virtual adapters or from any of the applications that utilize any of the virtual adapters. This queuing resource management technology may, for example, enable or improve the ability of computing device 110 to maintain separate connections to multiple devices such as to computing devices 120 and 130 and access point 140. In one example, these separate connections are via separate networks but over a shared network adapter.

Although the above example is described in the context of combining a virtual non-access point Wi-Fi station with a virtual Wi-Fi SoftAP on computing device 110, combinations of any other number or types of virtual adapters may be employed. For example, the described technology may be employed in conjunction with virtualization of multiple standards or protocols over the same network adapter. As one example, a Wi-Fi station and a WiMax station may be virtualized over a single physical radio. As another example, a WiMax station and a Bluetooth interface may be virtualized over a shared network adapter. As yet a further example, a Wireless Mesh Network adapter and a Wi-Fi adapter may be virtualized on the same computing device.

Figure 2:
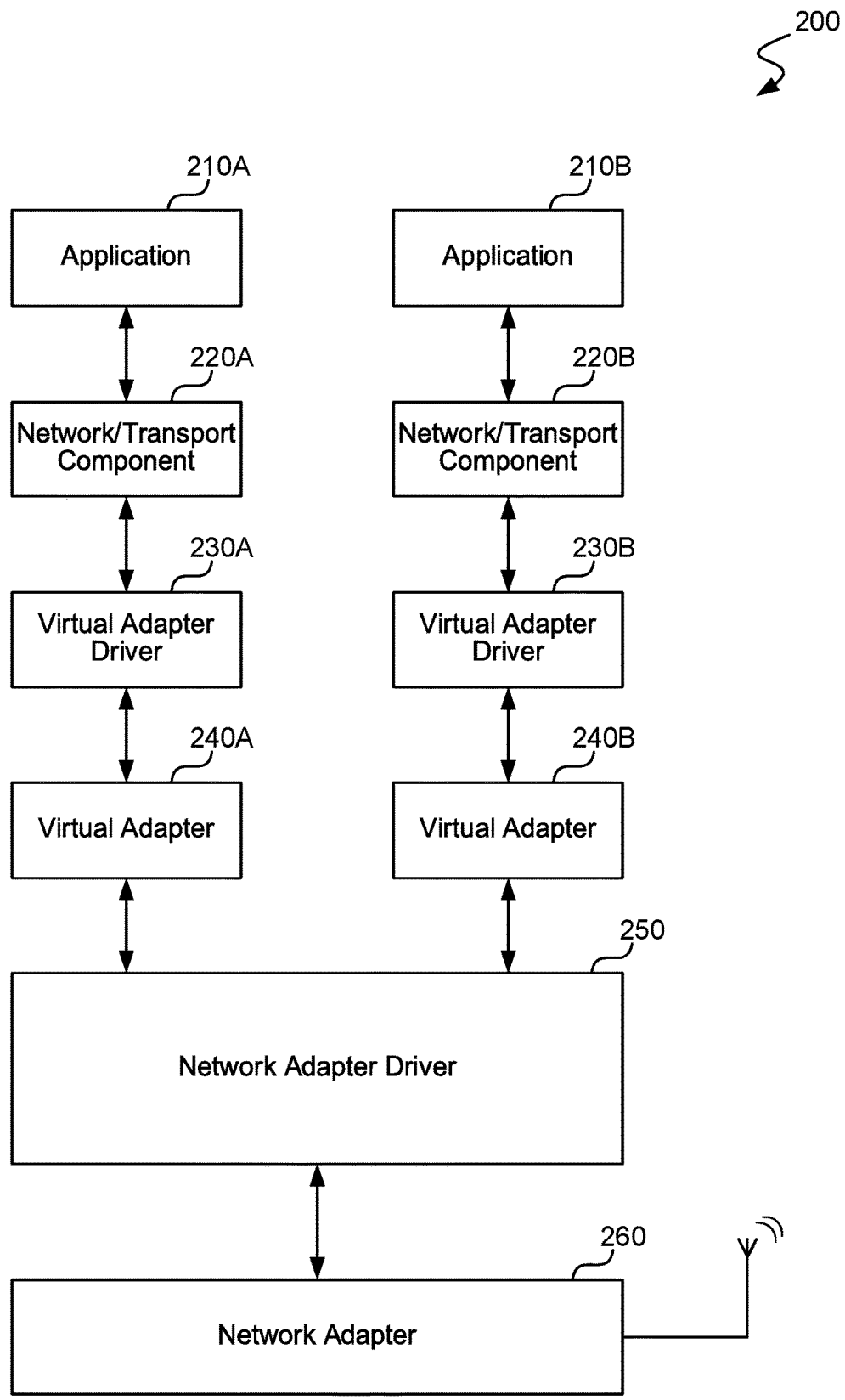
FIG. 2 is a block diagram illustrating functional blocks of a computing device in which aspects of the technology may be employed.

FIG. 2 is a block diagram illustrating functional blocks of computing device 200, which may be an embodiment of computing device 110, 120, or 130 of FIG. 1. As illustrated, computing device 200 includes applications 210A and 210B, network/transport components 220A and 220B, virtual adapter drivers 230A and 230B, virtual adapters 240A and 240B, network adapter driver 250, and network adapter 260. Although two sets of applications, network/transport components, virtual adapter drivers, and virtual adapters are illustrated in computing device 200, this is merely for clarity of illustration. Any number of applications may be associated with a particular virtual adapter path and any number of virtual adapters paths may be employed in a particular computing device.

Applications 210A and 210B may include any type of application that may receive or transmit data over a network or other communications medium, or be otherwise coupled to a communications medium. For example, applications 210A and 210B may include user-mode programs, kernel-mode processes, virtual machines, or the like. Likewise, applications 210A and 210B may also include programs or components that interface other devices or components to a communications medium.

Applications 210A and 210B or the data transmitted or received by applications 210A and 210B may be associated with priority information. For example, such priority information may define a quality of service or class of service for one or more data streams from/to applications 210A and 210B. As non-limiting examples, such priority information may include traffic category classifications as defined by the Enhanced Distributed Channel Access ("EDCA") portions of the Institute of Electrical and Electronics Engineers (IEEE) 802.11 standards, the user priority ("UP") definitions under IEEE 802.1D, differentiated services ("DiffServ") information, or the like. However, priority information may also be based on other communications characteristics such as latency requirements, bandwidth requirements, or jitter requirements whether or not such requirements are formally associated with, informally associated with, or independent of classification standards or definitions.

In one typical example, applications 210A and 210B are configured to communicate with applications on other computing devices over a communications link, but may not be "aware of" or "concerned with" the underlying communications infrastructure. For example, the structure/organization of the underlying virtual and physical network adapters are typically abstracted away from, are not relevant to, and are not shared with applications 210A and 210B. In other words, applications 210A and 210B may be "unaware" that they are communicating via virtualized network adapters.

Applications 210A and 210B may be respectively interfaced to virtual adapters 240A and 240B via network/ transport components 220A and 220B and virtual adapter drivers 230A and 230B. For example, network/transport components 220A and 220B may provide functionality typically associated with layers 3, 4, or higher of the Open System Interconnection (OSI) model. As one example, network/transport components 220A and 220B convert data from/for the applications to/from Transmission Control Protocol (TCP), User Datagram Protocol (UDP), and Internet Protocol (IP) packets. Optionally, network/transport components 220A and 220B may be part of an operating system.

In addition, virtual adapter drivers 230A and 230B may provide respective interfaces between network/transport components 220A and 220B and virtual adapters 240A and 240B. For example, virtual adapter drivers 230A and 230B may be adapted to provide interface, translation, and abstraction functionalities commonly associated with device drivers. As one example, virtual adapter drivers 230A and 230B may provide functionality typically associated with layers 2 and lower of the OSI model.

As shown, virtual adapters 240A and 240B are configured to interface applications 210A and 210B to lower levels interfaces such as network adapter driver 250 and network adapter 260. For example, virtual adapters 240A and 240B may each be a virtual non-access point Wi-Fi adapter, a virtual Wi-Fi SoftAP adapter, a WiMax adapter, a Bluetooth interface, a Wireless Mesh Network adapter, a ZigBee interface, or the like. However, the above examples are merely some of the many possible virtual adapters that may be employed with the disclosed technology. Further, each virtual adapter may couple computing device 200 to a separate network, e.g., to enable computing device 200 to maintain simultaneous connections with multiple networks over a shared network adapter. However, multiple virtual adapters on one computing device may alternately be configured to provide multiple connections to the same network. These and other possibilities are encompassed by the disclosed technology.

In computing device 200, network adapter driver 250 is configured to interface both virtual adapters 240A and 240B to network adapter 260, for example, by providing the interface, translation, and abstraction functionalities commonly associated with device drivers. In addition, network adapter driver 250 may also be configured to provide or enable some or all of the queuing resource management technology described herein.

For example, one implementation of network adapter driver 250 is adapted to receive data from applications 210A and 210B via the paths associated with virtual adapters 240A and 240B, to pre-buffer or otherwise queue the received data, and to selectively transfer the received data to network adapter 260. More specifically, network adapter driver 250 may be configured to transfer data to a queue of network adapter 260 from queues of virtual adapters 240A and 240B or from queue(s) of network adapter driver 250. This transfer may be controlled based on the queuing resource management technology described herein.

In addition, network adapter driver 250 may also be adapted to determine how efficiently data streams for each of applications 210A and 210B or other data transmission sources is transmitted from network adapter 260 (e.g., to a network, to a network peer, etc.). These determinations may be based on feedback or other status indications received from network adapter 260. Further, this feedback may be provided by network adapter 260 (and received by network adapter driver 250) on a data stream by data stream basis.

In operation, this feedback may be used to control the transfer of data between multiple queues at different levels. For example, this feedback may be used to selectively transfer data from a "higher" level queue to a "lower" level queue (e.g., to move the data "closer" to transmission). As more specific examples, this feedback may be used to manage, on a stream-by-stream or other basis, the transfer of data from a queue of network adapter driver 250 to a queue of network adapter 260, from a virtual adapter queue to a network adapter driver or network adapter queue, between queues within a network adapter, or the like. In other words, this feedback may be employed as part of a "closed-loop" system that controls the transfer of data between queues. Likewise, this feedback may be used by network adapter driver 250 or other elements to control the transfer of data to network adapter 260, or to control reclamation of queuing resources in network adapter 260. Further details regarding these and other features are provided in conjunction with FIG. 3.

In the example of computing device 200, network adapter 260 is adapted to interface computing device 200 to a wireless medium under the control of network adapter driver 250, e.g., by enabling transmission and reception of data to the wireless medium via an air interface. As one example, network adapter 260 is a physical Wi-Fi adapter embodied in what may commonly be referred to as a "wireless card." These and other examples of network adapter 260 may include a wireless receiver and a wireless transmitter that are respectively adapted to receive and transmit data via the wireless medium under the control of network adapter driver 250. In addition, certain implementations of network adapter 260 may be half-duplex network interfaces. For example, network adapters that are designed to operate with half-duplex duplex protocols may be half-duplex interfaces. However, other network adapters may be full duplex interfaces.

Whether or not network adapter 260 is a wired or wireless network adapter, network adapter 260 may include a finite amount of queuing resources such as queue space (e.g., to buffer data to be transmitted, to buffer received data before it is transferred to network adapter driver 250, etc.) or a finite amount of resources for managing queue space (e.g., control processor resources, registers, signal processing resources, etc.). Network adapter 260 may also be adapted to transmit data to a network based on priorities associated with the various data streams that are queued or partially queued in network adapter 260. However, network adapter 260 cannot transmit data that it does not have and may not be able to prioritize data for transmission if that data has not been transferred to a local queue.

Further, network adapter 260 may be adapted to provide feedback regarding availability of queue space or other queuing resources to other elements such as network adapter driver 250, and may be adapted to reclaim queuing resources/flush transferred but untransmitted data in response to commands from network adapter driver 250 or other elements. These and other features are discussed in greater detail in conjunction with FIG. 3.

In typical implementations, applications 210A and 210B, network/transport components 220A and 220B, virtual adapter drivers 230A and 230B, virtual adapters 240A and 240B, and network adapter driver 250 would be implemented in software (e.g., either as part of an operating system, as user-mode software, kernel-mode software, or as a combination of user-mode software and kernel-mode software) while network adapter 260 would be implemented in combinations of firmware and hardware. However, other implementations are possible. For example, functionalities described as implemented in network adapter 260 may be implemented in software (e.g., within network adapter driver 250 or another component) or functionalities described as performed by network adapter driver 250 may be implemented within network adapter 260. The disclosed technology may be implemented in these and other ways.

In addition, while FIGS. 1 and 2 describe virtualized devices and systems in which the technology may be particularly beneficial, the disclosed technology may also be implemented in non-virtualized devices or systems. For example, aspects of the technology may be employed to manage the transfer of data from multiple applications to a shared network adapter without an intermediate virtual adapter, e.g., by binding the applications to a network adapter driver for the shared network adapter. These and other examples are possible implementations of the disclosed technology.

Figure 3:
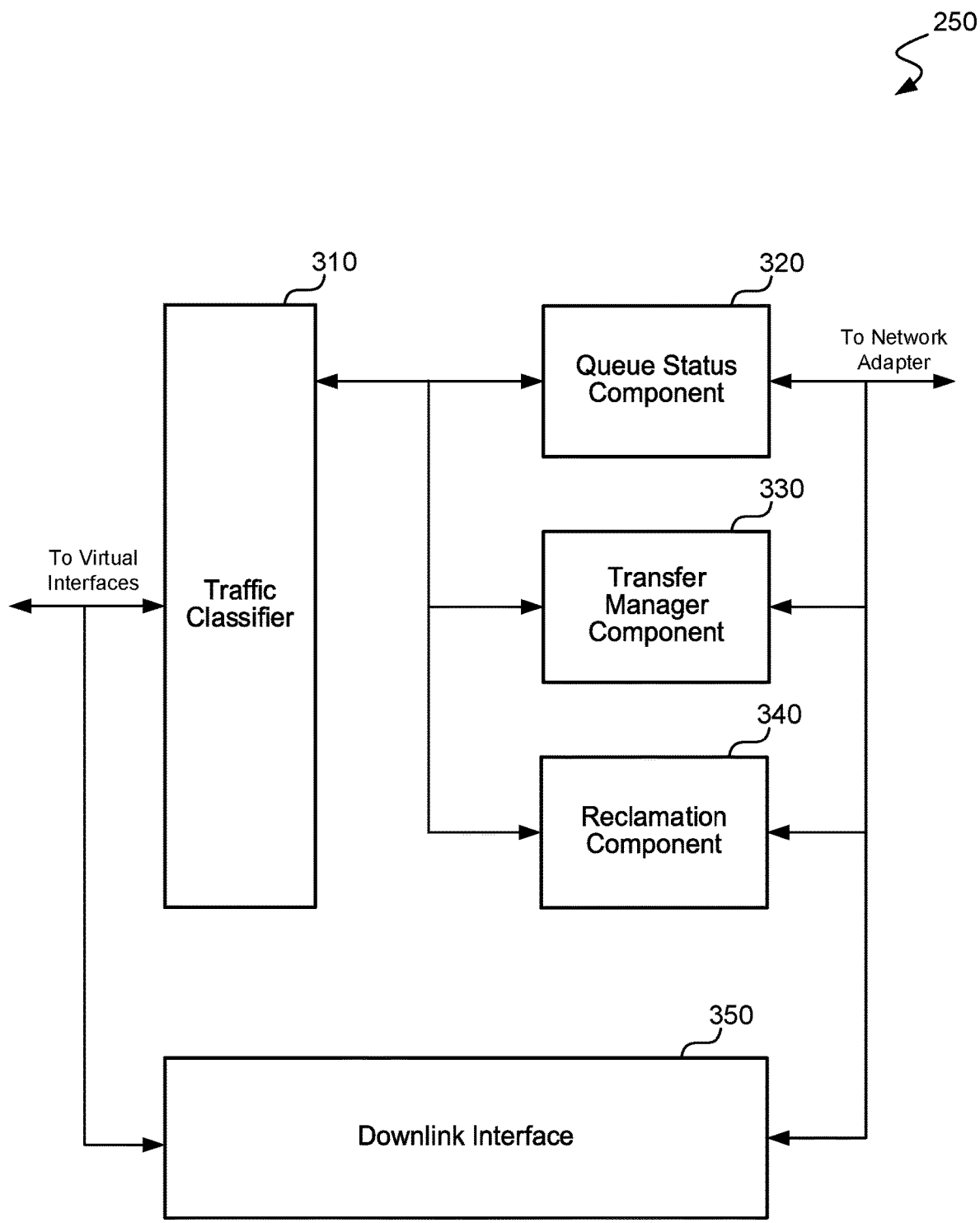
FIG. 3 is a block diagram illustrating functional blocks of network adapter driver 250 of FIG. 2.

FIG. 3 is a block diagram illustrating functional blocks of network adapter driver 250 of FIG. 2. As illustrated, network adapter driver 250 includes traffic classifier 310, queue status component 320, transfer manager component 330, reclamation component 340, and downlink interface 350. However, other network adapter drivers may include other, additional, or fewer components. Further, each of these functional blocks may be implemented as a computer program, computer procedure, software routine, object, function, source code, intermediate code, executable code, firmware, hardware, or as any suitable combination of these and other suitable technologies.

In one example, traffic classifier 310 may be adapted to receive data from multiple virtual adapters and to interface the received data to the shared network adapter via the other components of network adapter driver 250. Additionally, traffic classifier 310 may also receive, infer, or determine priority information associated with the received data and provide this priority data to the shared network adapter or other components of network adapter driver 250. Further traffic classifier 310 may receive the data or priority information from a queue or other element of a virtual adapter, for example, in response to polling the virtual adapters, in response to interrupts, or the like. Alternately, traffic classifier 310 may passively receive the data or priority information from virtual adapters or other data sources.

As illustrated, network adapter driver 250 also includes queue status component 320 which may be adapted to receive status indications regarding availability of queuing resources in the shared network adapter. For example, these status indications may be notifications of amounts of empty space in a queue of the shared network adapter (e.g., numbers of packets, bytes, bits, frames, etc. that the shared network adapter can currently accept for queuing) or representations of the availability of other queuing resources. In addition, the status indications may be received by queue status component 320 via independent status messages, or via messages that accompany other signaling. For example, status indications may be "piggybacked" onto send complete messages that are provided by the shared network adapter in response to the transfer of data to the shared network adapter. These send complete messages may also indicate the shared network adapter's acceptance of responsibility for transmitting the data to a network.

Additionally, queue status component 320 may also be adapted to receive transmission information from the shared network adapter regarding queuing resources, a status of a wireless medium, accesses to a communications medium, a network connection, a state of a connection to a network peer, a transmission rate, or transmission efficiency. The transmission information may also be related to specific data streams or to all data streams associated with the shared network adapter. For example, the transmission information may enable transfer manager component 330 to stop, pause, or slow down the transfer of data from specific data streams based on the conditions of the shared network adapter or of the network. As with the status indications, the transmission information from the shared network adapter may be received by queue status component 320 via independent status messages, or via messages that accompany other signaling messages (e.g., piggybacked on send complete messages).

As illustrated, network adapter driver 250 also includes transfer manager component 330 which is adapted to transfer data from data streams to the shared network adapter based on availability of queuing resources in the shared network adapter. For example, transfer manager component 330 may be adapted to selectively transfer data from multiple data streams to a queue of the shared network adapter based on the status indications and on transmission information received by queue status component 320.

In an example implementation, transfer manager component 330 transfers data from the virtual adapters to the shared network adapter any time data arrives via traffic classifier 310 while queue status component 320 indicates that the shared network adapter can accept the received data. However, if queue status component 320 indicates that the shared network adapter does not have sufficient queuing resources to currently receive the data, transfer manager component 330 may queue the data for later transfer to the shared network adapter or, in conjunction with traffic classifier 310, may defer acceptance of the data.

The transfers to the shared network adapter may also be prioritized based on a variety of prioritization schemes. For example, transfer manager component 330 may implement a strict priority scheme that selectively transfers data to the shared network adapter based on data stream priority information. Further, the selective transfer may be based on per data stream priority where each data stream is associated with a unique combination of an originator, priority level, and destination.

Alternately, transfer manager component 330 may implement a prioritization scheme that is based on the transmission efficiency of the respective data streams. For example, the transmission efficiency of a data stream may be based on a rate at which data from that data stream is transmitted to the network or is acknowledged by a remote network peer. Additionally or alternately, transmission efficiencies may be based on the amount of queuing resources in the shared network adapter that are used by that data stream. In one specific example, the efficiency of a particular data stream may be calculated via the formula:

$$Eff_{stream} = \frac{R_{stream}/R_{total}}{ST_{stream}/ST_{avg}}.$$

In this specific formula, $Eff_{stream}$ represents the efficiency of a particular stream, $R_{stream}$ represents a quantity of queuing resources used by that stream, $R_{total}$ represents a total quantity of queuing resources used by multiple data streams or represents a quantity of queuing resources in the shared network adapter, $ST_{stream}$ represents a ratio of successful transmissions from that stream, and $ST_{avg}$ represents an average ratio of successful transmissions for the multiple data streams or represents a weighed sum of successful transmissions for the multiple data streams. In this and other examples, each data stream's efficiency may also be averaged over one or more periods (e.g., beacon intervals, frame periods, transmission windows, etc.). However, these are only some of many possible ways of calculating the efficiency of data streams.

Transfer manager component 330 may also reduce a data stream's transfer rate or pause transfers from a data stream to the shared network adapter based on transmission efficiency. For example, transfer manager component 330 may halve a data stream's transfer rate if that data stream has a calculated efficiency that is below one for one period and may pause transfers from that data stream if the efficiency is below one for two periods. Also, transfer manager component 330 may implement rate halving by not transferring data from the data stream at every other transfer opportunity.

Transfer manager component 330 may also include features for increasing the transfer rates of various data streams. For example, transfer manager component 330 may restore or otherwise increase a transfer rate for a reduced transfer rate data stream or a paused data stream after a certain number of periods have elapsed. However, a transfer rate may also be increased after that data stream has an efficiency above a threshold for a given number of periods, data from a lower priority data stream has been transferred, or the like. In one example, a transfer rate of a reduced transfer rate stream is restored if that data stream's efficiency is greater than one for one period. Additionally, transfer manager component 330 may also implement technology that batches data transfers, e.g., to avoid inefficient transfer of small amounts of data.

In the illustrated example of FIG. 3, network adapter driver 250 also includes reclamation component 340 which may be adapted to manage reclamation of queuing resources in the shared network adapter, e.g., to flush data from low efficiency data streams or to facilitate transfer of data from higher priority data streams.

Reclamation component 340 may be adapted to transmit flush commands that instruct the shared network adapter to flush data. In response to such commands, the shared network adapter may then flush data, e.g., from a data stream associated with a lowest transmission efficiency, then transmit a status indication or other acknowledgement to queue status component 320 that indicates that queuing resources have become available.

Reclamation component 340 may also issue flush commands in response to determinations that additional queuing resources in the shared network adapter is to be allocated to data from a particular data stream. Such a determination may be made by transfer manager component 330, reclamation component 340, or another element and may be based on transmission information receive at queue status component 320 or from information regarding a rate at which a data stream is received at traffic classifier 310. Additionally, flush commands may be transmitted along with additional data for transmission, e.g., packets from a data stream with a higher priority than that of the to-be-flushed data or the transfer of additional data to the shared network adapter may be deferred until the shared network adapter acknowledges the flush command.

Within network adapter driver 250, traffic classifier 310, queue status component 320, transfer manager component 330 and reclamation component 340 may be elements of an uplink path while downlink interface 350 provides a downlink path. However, other devices or systems may vary. For example, various aspects of the disclosed technology may also be employed in a downlink path, e.g., to control the transfer of data from lower level queues to higher level queues.

Illustrative Processes

Figure 4:
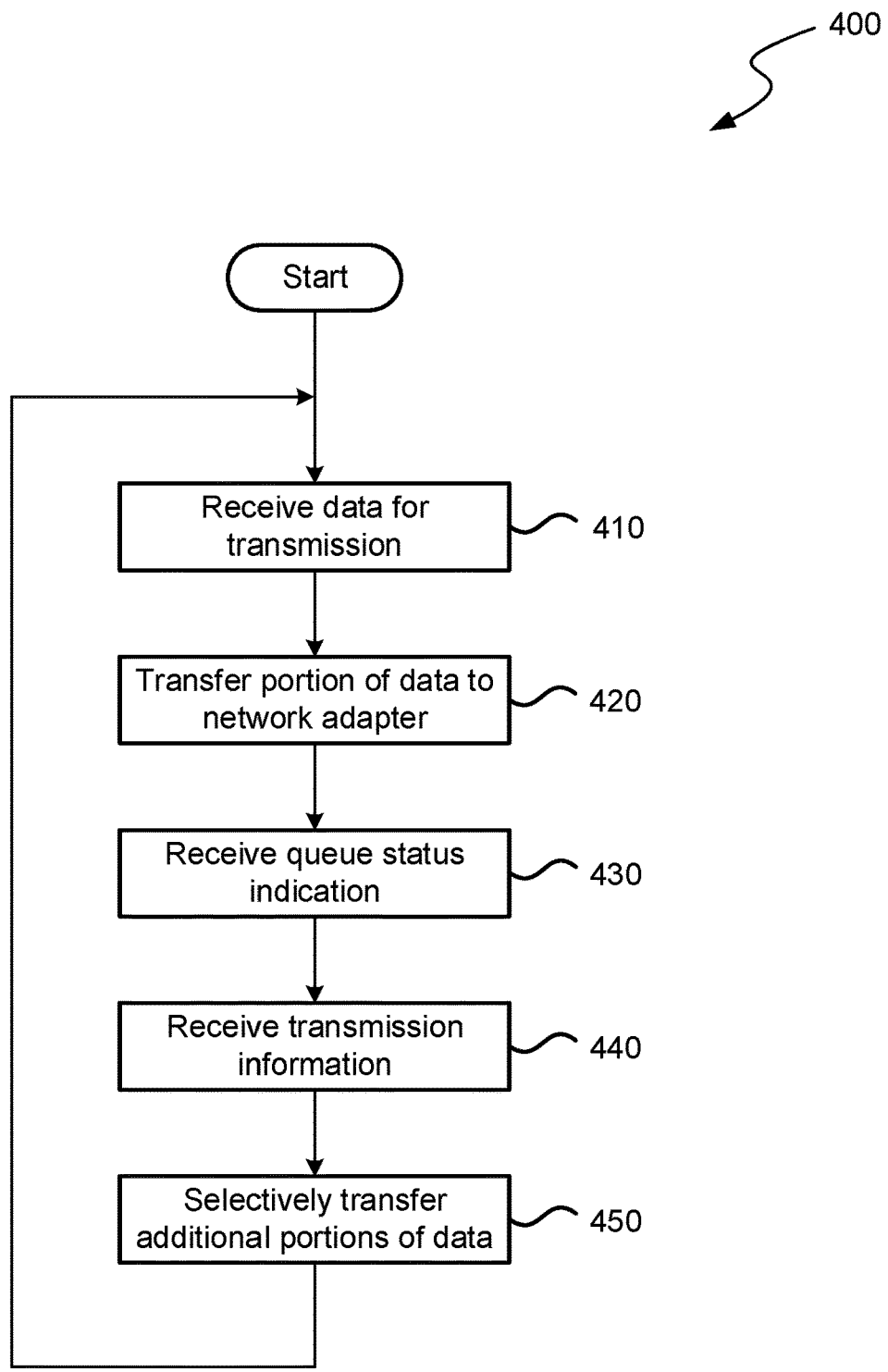
FIG. 4 is a logical flow diagram illustrating a process for managing queuing resources of a shared network adapter according to aspects of the technology.

FIG. 4 is a logical flow diagram illustrating process 400 for managing queuing resources of a shared network adapter. For clarity, process 400 is described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into process 400 or other processes, whether or not that technology is specifically described in conjunction with a process. Process 400 may also be performed on or by other devices, components, or systems, whether or not such devices, components, or systems are described herein. These processes may also be embodied in a variety of ways. For example, they may be embodied on an article of manufacture, e.g., as computer-readable instructions stored in a computer-readable storage medium or be performed as a computer-implemented process. As an alternate example, these processes may be encoded as computer-executable instructions and transmitted via a communications medium.

Process 400 begins at 410 where data that is to be transmitted is received from multiple data streams. In one implementation, these data streams are received at traffic classifier 310 from applications associated with multiple virtual stations. However, these data streams may also be received directly by traffic classifier 310 (e.g., from applications that are interfaced to a network adapter driver without an intervening virtual adapter). In addition, the received data may include priority information.

At 420, a portion of the received data is transferred to the shared network adapter. For example, transfer manager component 330 may transfer data to the shared network adapter until a queue of the shared network adapter has been filled. While this data is being transferred, the shared network adapter may provide status indications regarding the availability queuing resources.

At 430, queue status component 320 receives the status indication and provides signaling to transfer manager component 330 to manage the flow of data to the shared network adapter. For example, this status indication may be utilized by queue status component 320 and transfer manager component 330 to ensure that data is not transferred to the shared network adapter when the shared network adapter's queue is full.

At 440, queue status component 320 receives transmission information from the shared network adapter. As one example, this transmission information is based on transmission efficiency of each of the data streams being transmitted via the shared network adapter. This transmission may then be analyzed, for example, by transfer manager component 330 or reclamation component 340, to determine efficiencies for the various data streams associated with the shared network adapter. Alternately, the received transmission information may include calculated efficiencies for the data streams. Regardless, transfer manager component 330 may employ the transmission information to selectively transfer additional portions of the data to the shared network adapter.

From 440, processing flows to 450 where the additional portions of the data are transferred to the shared network adapter and processing may loop back to 410 for the continued management of queuing resources.

Illustrative Devices/Operating Environments

Figure 5:
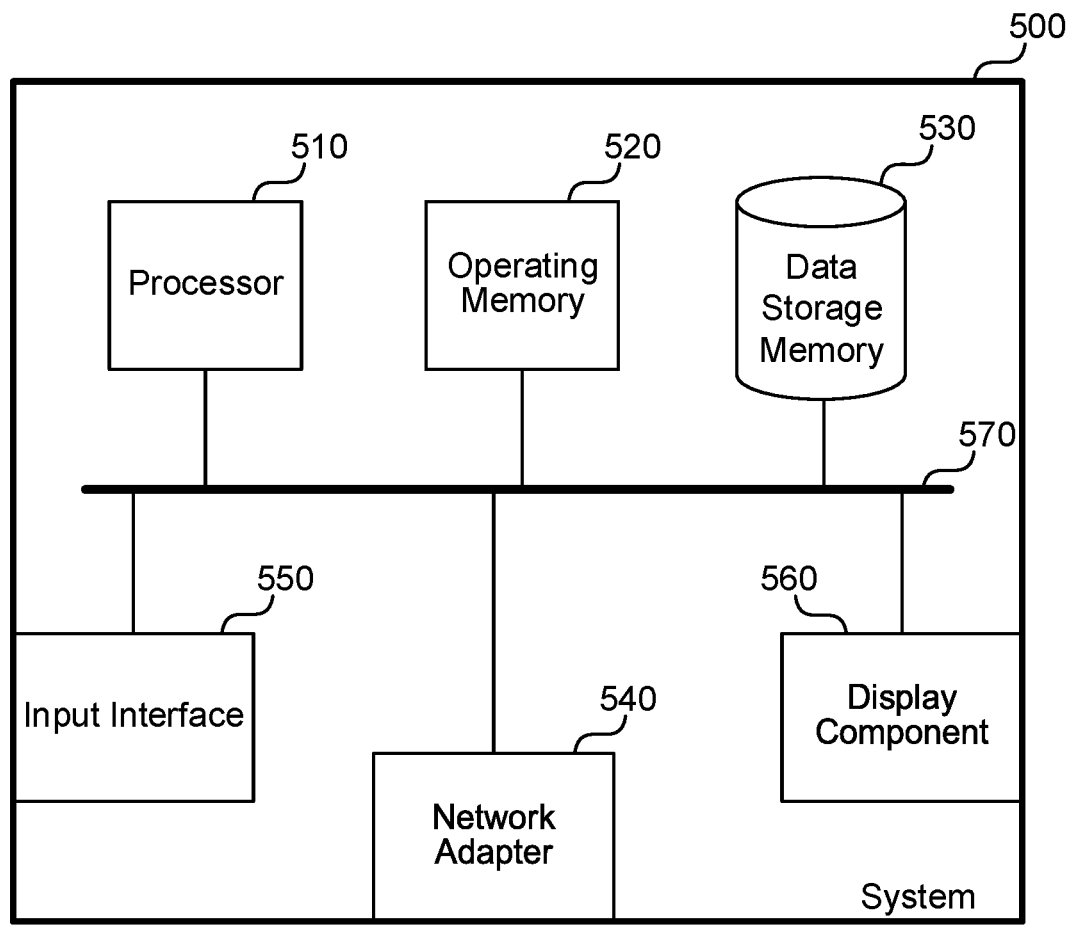
FIG. 5 is a block diagram illustrating example hardware components of a computing device in which aspects of the technology may be practiced.

FIG. 5 is a high-level illustration of example hardware components of computing device 500, which may be used to practice various aspects of the technology. For example, computing device 500 may be employed to perform process 400 of FIG. 4. Computing device 500 may also be an embodiment of computing device 200 of FIG. 2. As shown, computing device 500 includes processor 510, operating memory 520, data storage memory 530, network adapter 540, input interface 550, and display component 560. These aforementioned components may be interconnected by bus 570.

As with computing device 200, computing device 500 may be virtually any type of general- or specific-purpose computing device. For example, computing device 500 may be a user device such as a desktop computer, a laptop computer, a tablet computer, a display device, a camera, a printer, or a smartphone. Likewise, computing device 500 may also be server device such as an application server computer, a virtual computing host computer, or a file server computer.

Computing device 500 includes at least one processor 510 configured to execute instructions, such as instructions for implementing the above-described processes or technology. The aforementioned instructions, along with other data (e.g., datasets, metadata, operating system instructions, etc.), may be stored in operating memory 520 and/or data storage memory 530. In one example, operating memory 520 is employed for run-time data storage while data storage memory 530 is employed for long-term data storage. However, each of operating memory 520 and data storage memory 530 may be employed for either run-time or long-term data storage. Each of operating memory 520 and data storage memory 530 may also include any of a variety of data storage devices/components, such as volatile memories, semi-volatile memories, non-volatile memories, random access memories, static memories, disks, disk drives, caches, buffers, or any other media that can be used to store information. However, operating memory 520 and data storage memory 530 specifically do not include or encompass communications media, any communications medium, or any signals per se.

Also, computing device 500 may include or be coupled to any type of computer-readable media such as computer-readable storage media (e.g., operating memory 520 and data storage memory 530) and communication media (e.g., communication signals and radio waves). While the term computer-readable storage media includes operating memory 520 and data storage memory 530, this term specifically excludes and does not encompass communications media, any communications medium, or any signals per se.

Network adapter 540 maybe an embodiment of network adapter 260 of FIG. 2.

Computing device 500 also includes input interface 550, which may be configured to enable computing device 500 to receive input from users or from other devices. In addition, computing device 500 includes a display component 560, which may be configured to render displays. In one example, display component 560 includes a frame buffer, graphics processor, graphics accelerator, or a virtual computing host computer and is configured to render the displays for presentation on a separate visual display device (e.g., a monitor, projector, virtual computing client computer, etc.). In another example, display component 560 includes a visual display device and is configured to render and present the displays for viewing.

CONCLUSION

While the above Detailed Description describes certain embodiments of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific embodiments disclosed herein, unless the Detailed Description explicitly defines such terms. Accordingly, the actual scope of the technology encompasses not only the disclosed embodiments, but also all equivalent ways of practicing or implementing the technology.

We claim:

1. A method of managing queue space of a shared network adapter, comprising:
   receiving data for transmission by the shared network adapter from multiple virtual adapters;
   transferring portions of the data from the multiple virtual adapters to a queue of the shared network adapter;
   receiving transmission information from the shared network adapter regarding rates of transmitting the transferred data from the multiple virtual adapters out of the shared network adapter; and
   selectively transferring other portions of the received data to the queue of the shared network adapter based on a rate of transmitting data from a particular virtual adapter of the multiple virtual adapters out of the shared network adapter relative to a rate of transmitting data from another virtual adapter of the multiple virtual adapters out of the shared network adapter, the rate of transmitting data from the particular virtual adapter and the rate of transmitting data from the other virtual adapter being determined based on the transmission information from the shared network adapter.

2. The method of claim 1, wherein the transmission information from the shared network adapter includes:
   information regarding transmission rates for the data from each of the multiple virtual adapters; and
   information regarding amounts of queue space used by the data from each of the multiple virtual adapters.

3. The method of claim 1, further comprising:
   determining, based on the transmission information, that additional space in the queue of the shared network adapter is to be allocated to the data from a particular virtual adapter;
   transmitting a command to the shared network adapter to flush data from another virtual adapter associated with a lowest transmission efficiency; and
   transferring additional data from the particular virtual adapter to the queue of the shared network adapter.

4. The method of claim 1, wherein the selective transferring of the other portions of the received data is performed on a per data stream basis for a plurality of data streams from the multiple virtual adapters, wherein each data stream of the plurality of data streams is associated with a unique combination of an originating virtual adapter, priority level, and destination.

5. A method for interfacing a computing device to a network, the method comprising:
   receiving, from a virtual adapter of a plurality of virtual adapters, data for transmission to the network by a shared network adapter, the virtual adapters of the plurality of virtual adapters being configured to be interfaced to the network via the shared network adapter;
   transferring a portion of the received data to the shared network adapter;
   receiving information from the shared network adapter regarding a rate of transmitting data from the virtual adapter to the network and regarding a rate of transmitting data from another virtual adapter of the plurality of virtual adapters to the network; and
   selectively transferring another portion of the received data to the shared network adapter based on the rate of transmitting data from the virtual adapter to the network relative to the rate of transmitting data from the other virtual adapter to the network, the rate of transmitting data from the virtual adapter to the network relative to the rate of transmitting data from the other virtual adapter to the network being determined based on the information from the shared network adapter.

6. The method of claim 5, wherein at least a portion of the method is performed in a network adapter driver configured to interface the plurality of virtual adapters to the shared network adapter.

7. The method of claim 5, wherein selectively transferring the other portion is also based on of an amount of available space in a queue of the shared network adapter.

8. The method of claim 5, wherein the information also includes:
   information regarding transmission of a data stream of the virtual adapter from the shared network adapter to the network; and
   information regarding transmission of another data stream of another virtual adapter from the shared network adapter to the network.

9. The method of claim 8, wherein selectively controlling transfer rates to the shared network adapter is performed on a per data stream basis for a plurality of data streams, wherein each data stream of the plurality of data streams is associated with a unique combination of an originating virtual adapter, an associated access category, and an associated destination address.

10. The method of claim 8, wherein:
    the information regarding the transmission of the data stream is based on an amount of space used in a queue of the shared network adapter for the data stream and a transmission rate for the data stream; and the information regarding the transmission of the other data stream is based on another amount of space used in the queue for the other data stream and another transmission rate for the other data stream.

11. The method of claim 8, wherein the transmission information from the shared network adapter is received with status indication from the shared network adapter, and wherein the status indication is indicative of an availability of shared network adapter queuing resources.

12. The method of claim 5, wherein the information also includes:
information based on an efficiency of transmitting a data stream from the virtual adapter from a queue of the shared network adapter; and
information based on an efficiency of transmitting another data stream of another virtual adapter from the queue.

13. The method of claim 5, wherein selectively transferring the other portion of the received data is further based on Enhanced Distributed Channel Access (EDCA) access categories associated with data streams from the plurality of virtual adapters.

14. The method of claim 5, wherein transferring the portion of the received data includes transferring the portion of the data from a queue of the virtual adapter or from a queue of a network adapter driver to a queue of the shared network adapter.

15. The method of claim 5, further comprising:
receiving a status indication from the shared network adapter regarding availability of queuing resources of the shared network adapter, wherein the status indication from the shared network adapter is included in a send complete message from the shared network adapter, and wherein the send complete message also indicates an acceptance of responsibility by the shared network adapter for transmitting the portion of the data to the network.

16. The method claim 5, wherein:
the portion of the received data includes a plurality of data packets; and
the method further comprises:
transmitting a command to the shared network adapter to flush one or more data packets of the plurality of data packets from a queue of the shared network adapter, wherein the command is transmitted along with additional data packets for transmission by the shared network adapter, and wherein the additional data packets are associated with a higher priority than the data packets that are to be flushed.

17. The method of claim 5, wherein:
the portion of the received data includes a plurality of data packets; and
wherein the method further comprises:
transmitting a command to the shared network adapter to flush one or more data packets of the plurality of data packets from a queue of the shared network adapter;
receiving an acknowledgement to the command; and
in response to the acknowledgement, transferring additional data packets to the queue of the shared network adapter for transmission by the shared network adapter, wherein the additional data packets are associated with a higher priority than the data packets that are to be flushed.

18. A method for interfacing a computing device to a communications network, the method comprising:
receiving data from each of multiple data streams for transmission by a network adapter to the communications network;
receiving information from the network adapter regarding a rate of transmitting data to the communications network for one of the multiple data streams and regarding a rate of transmitting data to the communications network for another of the multiple data streams; and
selectively transferring the received data to a queue of the network adapter for transmission to the communications network based on the rate of transmitting data to the communications network for the one of the multiple data streams and the rate of transmitting data to the communications network for the other of the multiple data streams.

19. The method of claim 18, wherein:
multiple virtual adapters and a network adapter driver are implemented on the computing device;
at least two of the multiple virtual adapters each provide at least two of the multiple data streams to the network adapter driver; and
the network adapter driver is adapted to receive the data from the multiple virtual adapters, receive status indications from the network adapter, and transfer the received data to the queue of the network adapter in accordance with the received status indications.

20. The method of claim 19, further comprising:
transferring data from a first virtual adapter of the multiple virtual adapters to the queue of the network adapter based on the status indications and based on a rate at which queued data for a second virtual adapter is transmitted to the communications network.

21. A computer-readable storage medium having instructions stored therein for performing perform operations to interface a computing device to a communications network, the operations comprising:
receiving data from each of multiple data streams for transmission by a network adapter to the communications network;
receiving information from the network adapter regarding a rate of transmitting data to the communications network for one of the multiple data streams and regarding a rate of transmitting data to the communications network for another of the multiple data streams; and
selectively transferring the received data to a queue of the network adapter for transmission to the communications network based on the rate of transmitting data to the communications network for the one of the multiple data streams and the rate of transmitting data to the communications network for the other of the multiple data streams.

22. The computer-readable storage medium of claim 21, wherein:
multiple virtual adapters and a network adapter driver are implemented on the computing device;
at least two of the multiple virtual adapters each provide at least two of the multiple data streams to the network adapter driver; and
the network adapter driver is adapted to receive the data from the multiple virtual adapters, receive status indications from the network adapter, and transfer the received data to the queue of the network adapter in accordance with the received status indications.

23. A computing device, comprising:

a memory and a processor that are respectively adapted to store and execute instructions for performing operations that interface the computing device to a communications network, the operations comprising:

receiving data from each of multiple data streams for transmission by a network adapter to the communications network;

receiving information from the network adapter regarding a rate of transmitting data to the communications network for one of the multiple data streams and regarding a rate of transmitting data to the communications network for another of the multiple data streams; and selectively transferring the received data to a queue of the network adapter for transmission to the communications network based on the rate of transmitting data to the communications network for the one of the multiple data streams and the rate of transmitting data to the communications network for the other of the multiple data streams.

24. The computing device of claim 23, wherein:

multiple virtual adapters and a network adapter driver are implemented on the computing device;

at least two of the multiple virtual adapters each provide at least two of the multiple data streams to the network adapter driver; and the network adapter driver is adapted to receive the data from the multiple virtual adapters, receive status indications from the network adapter, and transfer the received data to the queue of the network adapter in accordance with the received status indications.

* * * * *